United States Patent
Graybill

(10) Patent No.: US 10,060,426 B2
(45) Date of Patent: Aug. 28, 2018

(54) SOLAR DRIVE CONTROL SYSTEM FOR OIL PUMP JACKS

(71) Applicant: Raptor Lift Solutions, LLC, Houston, TX (US)

(72) Inventor: Kavan Graybill, Leicester, NC (US)

(73) Assignee: Raptor Lift Solutions, LLC, Houston, TX (US)

( * ) Notice: Subject to any disclaimer, the term of this patent is extended or adjusted under 35 U.S.C. 154(b) by 0 days.

(21) Appl. No.: 15/482,873

(22) Filed: Apr. 10, 2017

(65) Prior Publication Data

US 2017/0370358 A1    Dec. 28, 2017

Related U.S. Application Data

(63) Continuation-in-part of application No. 14/208,299, filed on Mar. 13, 2014, now Pat. No. 9,617,990.
(60) Provisional application No. 61/852,540, filed on Mar. 18, 2013.

(51) Int. Cl.

| | |
|---|---|
| F04B 41/02 | (2006.01) |
| F04B 17/00 | (2006.01) |
| F04B 47/02 | (2006.01) |
| F04B 17/02 | (2006.01) |
| H02J 7/00 | (2006.01) |
| H02J 3/38 | (2006.01) |
| H02J 7/34 | (2006.01) |

(52) U.S. Cl.
CPC .......... F04B 47/022 (2013.01); F04B 17/006 (2013.01); F04B 17/02 (2013.01); H02J 7/0068 (2013.01); H02J 3/381 (2013.01); H02J 3/383 (2013.01); H02J 3/386 (2013.01); H02J 7/345 (2013.01)

(58) Field of Classification Search
CPC ....... F04B 41/022; F04B 14/006; F04B 14/02
USPC .................... 60/641.1, 641.8, 667
See application file for complete search history.

(56) References Cited

U.S. PATENT DOCUMENTS

| | | | |
|---|---|---|---|
| 5,409,356 A * | 4/1995 | Massie | F04B 47/022 |
| | | | 417/416 |
| 2005/0281680 A1 | 12/2005 | Schulz | |
| 2007/0075545 A1 | 4/2007 | Wilson et al. | |
| 2007/0286750 A1 | 12/2007 | Beck et al. | |
| 2008/0262857 A1* | 10/2008 | Perera | G06Q 30/00 |
| | | | 705/1.1 |
| 2010/0054959 A1 | 3/2010 | Rogers et al. | |
| 2010/0143158 A1* | 6/2010 | Alston | F04B 35/04 |
| | | | 417/44.11 |
| 2011/0097214 A1 | 4/2011 | Wentworth et al. | |

(Continued)

OTHER PUBLICATIONS

Rising oil prices have fueled advances in underground drilling but ground-level technologies have been stagnant for decades . . . Until Now. By Lozanova May/Jun. 2011.

*Primary Examiner* — Mark Laurenzi
*Assistant Examiner* — Dapinder Singh
(74) *Attorney, Agent, or Firm* — Baker & Hostetler LLP

(57) ABSTRACT

A system for supplementing the electric power needed by a pump jack electric motor, thereby reducing the electric power purchased from the local utility or power supplier. The system comprises a solar photovoltaic system, or other forms of renewable energy, and regenerated power from the electric motor or drive. The system can be both "on-grid" and "off-grid." Battery banks and capacitor banks may be used to store and provide energy.

5 Claims, 7 Drawing Sheets

(56) References Cited

U.S. PATENT DOCUMENTS

| | | |
|---|---|---|
| 2011/0103974 A1 | 5/2011 | Lamascus et al. |
| 2012/0177504 A1 | 7/2012 | Beck et al. |
| 2012/0223584 A1* | 9/2012 | Ledenev ........... H01L 31/02021 307/82 |
| 2013/0263613 A1* | 10/2013 | Bittner ................. F25B 25/005 62/56 |

* cited by examiner

SOLAR DRIVE CONTROL SYSTEM FOR OIL PUMP JACKS

This application is a continuation-in-part application of U.S. Ser. No. 14/208,299, filed Mar. 13, 2014, which claims benefit of and priority to U.S. Provisional Application No. 61/852,540, filed Mar. 18, 2013, by Kavan Graybill, and is entitled to those filing dates for priority in whole or in part. The specifications, figures and complete disclosures of U.S. Provisional Application No. 61/852,540 and U.S. Ser. No. 14/208,299 are incorporated herein by specific reference for all purposes.

FIELD OF INVENTION

This invention relates to a system for coordinating the use of solar energy and other forms of renewable energy with regenerated energy from oil pump jacks.

BACKGROUND OF THE INVENTION

A pump jack is a surface drive mechanism for a reciprocating piston pump in an oil well, and is used to mechanically lift oil or other liquids out of the well when there is insufficient subsurface pressure. Pump jacks are typically used onshore in relatively oil-rich areas. Modern pump jacks typically are powered by a electric motor, and the pump jack converts the motive force of the motor to a vertical reciprocating motion to drive the pump shaft (thereby causing a characteristic nodding motion). Electrical power usually is obtained from the electrical grid of the local electric utility or power supplier.

SUMMARY OF INVENTION

In various exemplary embodiments, the present invention comprises a system for supplementing the electric power needed by a pump jack electric motor, thereby reducing the electric power purchased from the local utility or power supplier. In one embodiment, the system comprises a solar photovoltaic system and regenerated power from the electric motor or drive. The system can be both "on-grid" and "off-grid."

In an "on-grid" embodiment, the system allows for a balanced connection between the utility power grid and a solar photovoltaic system through the DC buss of a regenerative variable frequency drive (VFD) or variable speed drive. In general, the power required to operate the pump jack motor or drive is provided by the solar photovoltaic system and by the energy from the regenerative action from the operation of the pump jack on the electric motor. Any additional power required to operate the pump jack motor may come from the utility power grid. Any excess power may be sold back to the local utility via a "net meter" agreement or similar arrangement.

The solar photovoltaic system may be connected directly to the common DC buss on the regenerative variable speed drive, which allows the regenerative drive to convert energy produced by the solar photovoltaic system (which is DC energy) to synchronized 3-phase waveforms. This is the utility-required format for energy passed from the system to the utility grid.

In several embodiments, the regenerative capabilities of the drive must meet or exceed all utility requirements for power filtering and harmonic issues that are required for direct connection of the drive to the utility with respect to the driver supplying power back to the utility. The regenerative drive must meet or exceed all utility requirements concerning direct interconnection guidelines for small generator interconnect agreements.

In an "off-grid" embodiment, the system captures and/or reuses the power generated from a solar photovoltaic array, an optional wind turbine or wind turbine array, as well as the regenerated power from the pump jack drive. Regenerative power from the pump jack drive may be stored in a 480 DC capacitor bank, and fed back into the DC buss of the variable frequency drive. The solar and wind energy may be stored in a 480 DC battery bank. Energy needed to run the pump jack motor is pulled from the capacitor bank, with additional energy as needed pulled from the battery bank. In another embodiment where the system is connected to the power grid as well, the power grid also may be a source of energy to make up any difference. The battery bank and capacitor bank are sized by the load needed to operate the respective pump jack drive or motor.

DETAILED DESCRIPTION OF EXEMPLARY EMBODIMENTS

In various exemplary embodiments, the present invention comprises a system for supplementing the electric power needed by a pump jack electric motor, thereby reducing the electric power purchased from the local utility or power supplier. In one embodiment, the system comprises a solar photovoltaic system and regenerated power from the electric motor or drive. The system can be both "on-grid" and "off-grid."

Figure 1:
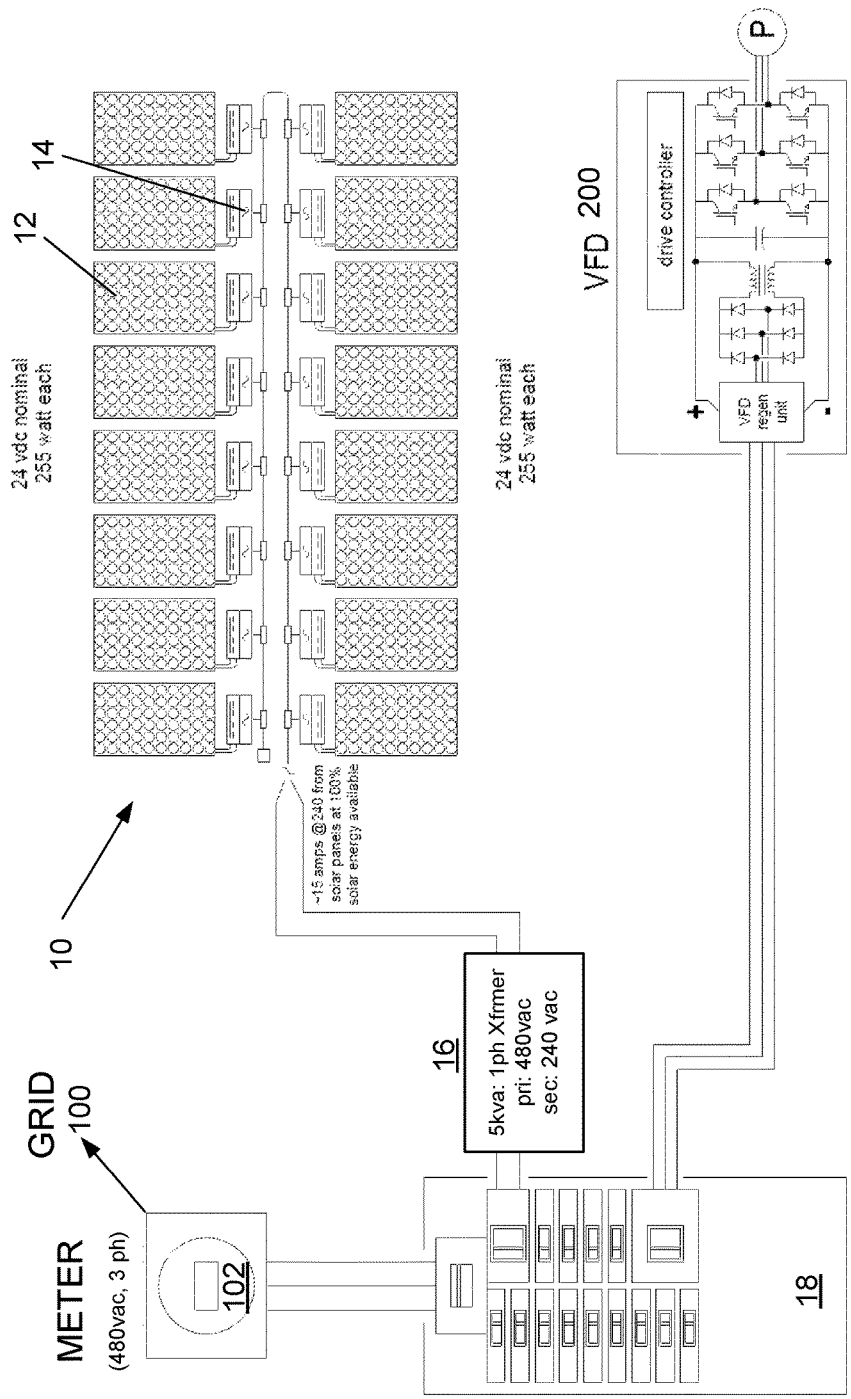
FIG. 1 shows a view of a system in accordance with an embodiment of the present invention.

In an "on-grid" embodiment, as seen in FIG. 1, the system allows for a balanced connection between the utility power grid 100 and a solar photovoltaic system 10 through the DC buss of a regenerative variable frequency drive (VFD), also referred to by several other terms, including, but not limited to, variable speed drive, variable speed controller, or similar terms 200. In general, the power required to operate the pump jack motor or drive is provided by the solar photovoltaic system 10 and by the energy from the regenerative action from the operation of the pump jack on the electric motor. Any additional power required to operate the pump jack motor may come from the utility power grid 100. Any excess power may be sold back to the local utility via a "net meter" agreement or similar arrangement.

As seen in FIG. 1, in one embodiment the solar photovoltaic system comprises an array of solar panels 12 (with kW output sized by load), connected through individual solar inverters 14 (which, in the embodiment shown, converts 24V DC to 240V AC) to a transformer 16, which in turn is connected to the power distribution box 18. In this embodiment, the transformer converts 240V AC to 480V AC single phase. The power distribution box is connected to the power grid 100 through a meter 102. The VFD with front-end regenerative unit controls the speed of the motor, and is grid tied to the invertor for the solar array system converting 480V AC single phase to 480V three phase. The regenerative unit may be integrated with the VFD, or may be a separate unit connected thereto.

Figure 2:
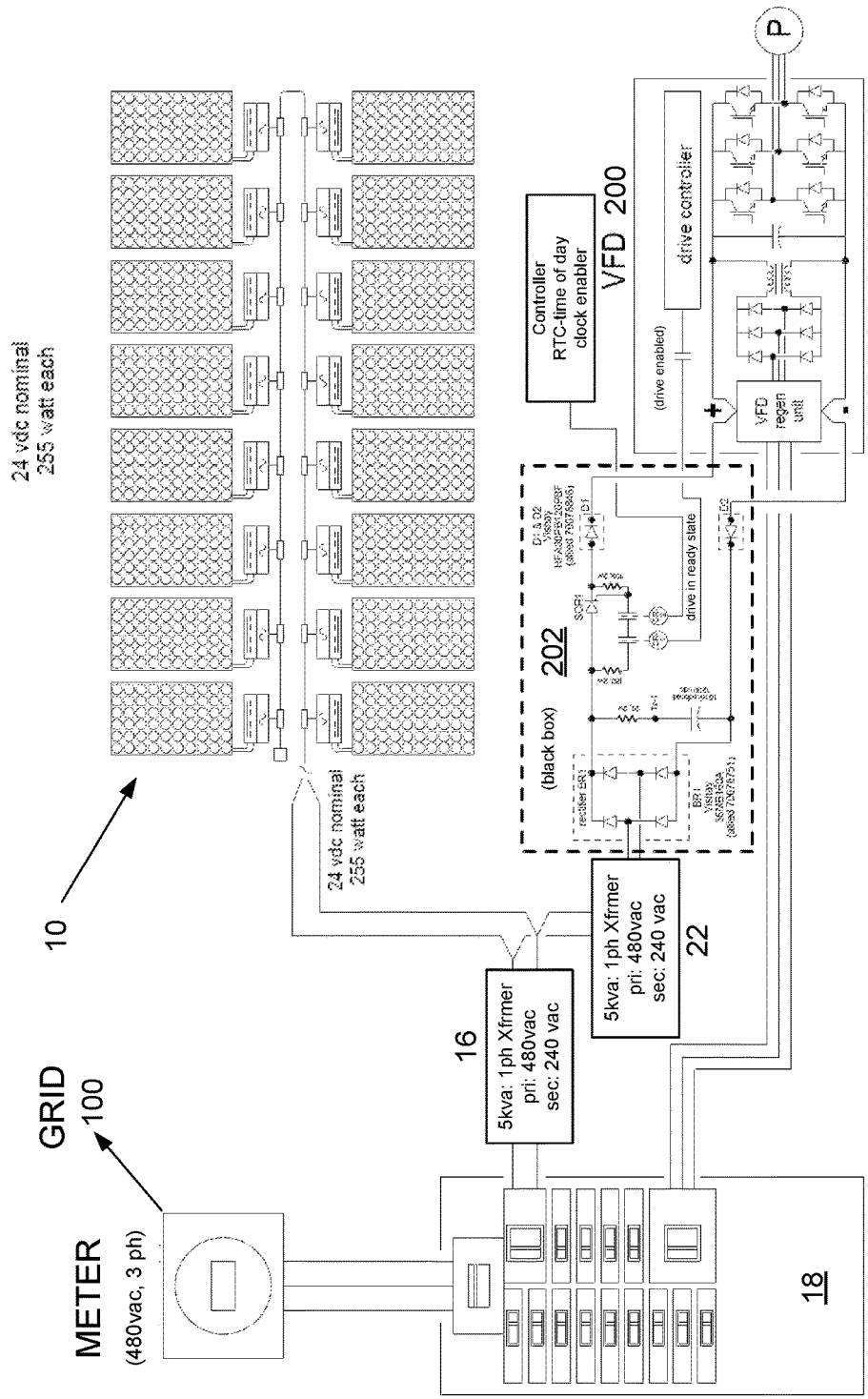
FIG. 2 shows a view of a system with direct connection between the solar array and the regenerative unit of the variable speed drive.

As seen in FIG. 2, the solar photovoltaic system 10 may be connected directly to the common DC buss on the regenerative VFD 200, which allows the regenerative drive to convert energy produced by the solar photovoltaic system (which is DC energy) to synchronized 3-phase waveforms. This is the utility-required format for energy passed from the system to the utility grid. In the embodiment shown, a second transformer 22 is added (in this embodiment, converting 240V AC to 480 V AC), and is connected to inverter 202, which inverts 480V AC single phase to 650V DC, thereby tying the energy from the solar panel array directly to the VFD 200.

In several embodiments, the regenerative capabilities of the drive must meet or exceed all utility requirements for power filtering and harmonic issues that are required for direct connection of the drive to the utility with respect to the driver supplying power back to the utility. The regenerative drive must meet or exceed all utility requirements concerning direct interconnection guidelines for small generator interconnect agreements. For both of the above examples, the parameters for the VFD may be adjusted to increase the amount of regenerated energy and optimize the power usage of the pump jack.

While the above discussion was in the context of solar power, other forms of renewable energy sources may be used, including, but not limited to, wind and hydro-electric. These may be used separately, or in combination.

Figure 3:
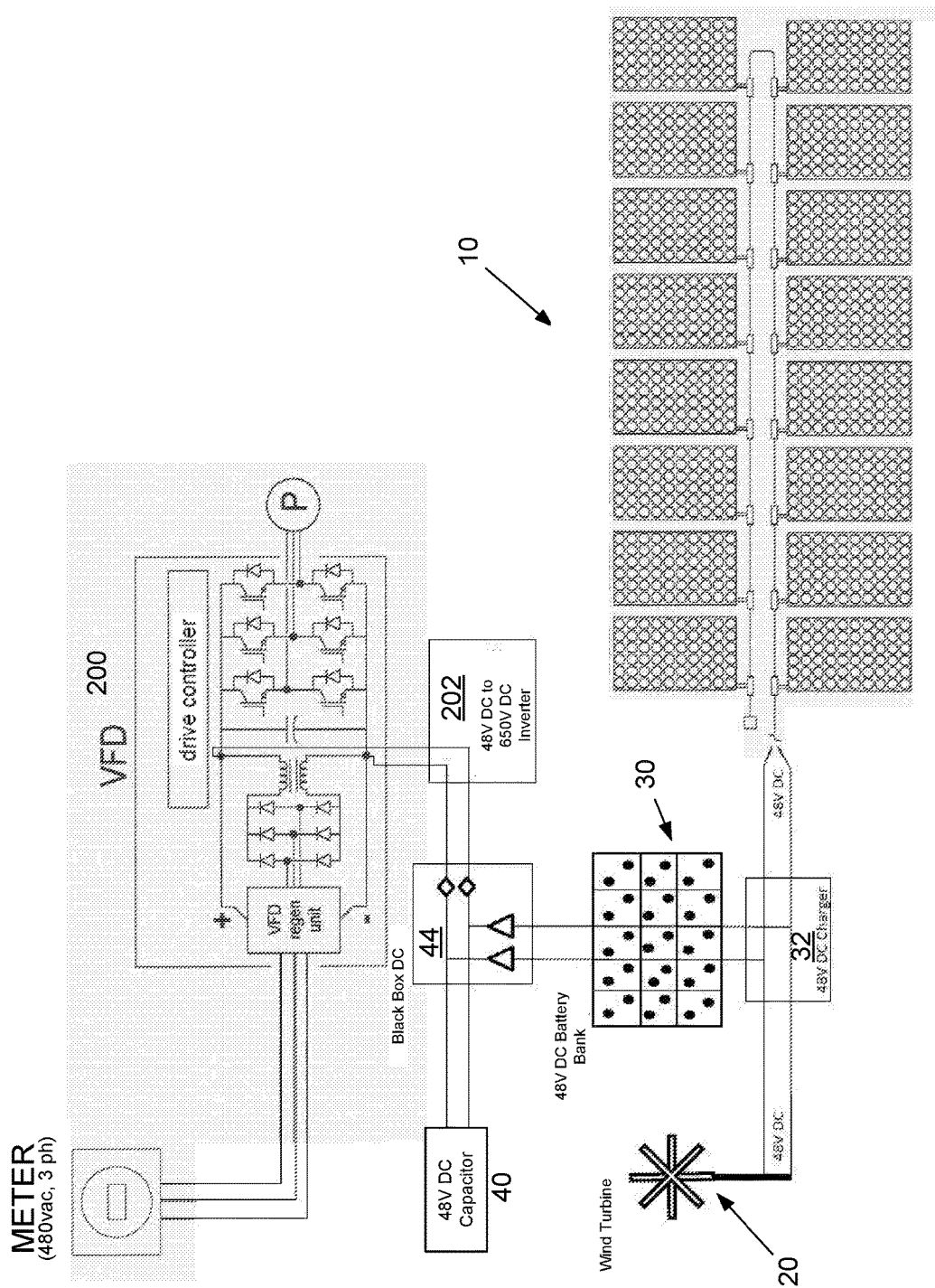
FIG. 3 shows a view of an "off-grid" system.

In an "off-grid" embodiment with combined renewable energy sources, as seen in FIG. 3, the system captures and/or reuses the power generated from a solar photovoltaic array 10, an optional wind turbine or wind turbine array 20, as well as the regenerated power from the pump jack drive. Regenerative power from the pump jack drive may be stored in a DC capacitor bank (in this example, 48V) 40, and fed back into the DC buss of the variable frequency drive 200. The solar and wind energy are directed through a DC battery charger 32 (with size determined by the amount of energy generated by the solar array and wind turbine; in this example, 48V DC), and may be stored in a DC battery bank (in this example, 48V DC) 30. In one embodiment, the batteries may be lithium ion or lead acid batteries, and sized based on expected loads.

The capacitor bank is the storage bank for regenerated power from the motor, and allows the regenerated power to be stored and reused. In one embodiment, the bank comprises nickel oxide hydroxide high amperage capacitors.

Energy needed to run the pump jack motor is pulled from the capacitor bank 40, with additional energy as needed pulled from the battery bank 30, through a DC interconnection box 44. The interconnection box allows for level flow of DC power back to the capacitor bank, but stopping any reverse flow to the battery bank. The interconnection box is connected to inverter 202, which inverts 480V AC single phase to 650V DC (as described above for the direct connection embodiment).

In another embodiment where the system is connected to the power grid as well, the power grid also may be a source of energy to make up any difference. The battery bank and capacitor bank are sized by the load needed to operate the respective pump jack drive or motor. The VFD 200 controls the speed of the motor, and acts as inverter for on-grid and off-grid configurations.

Figure 4:
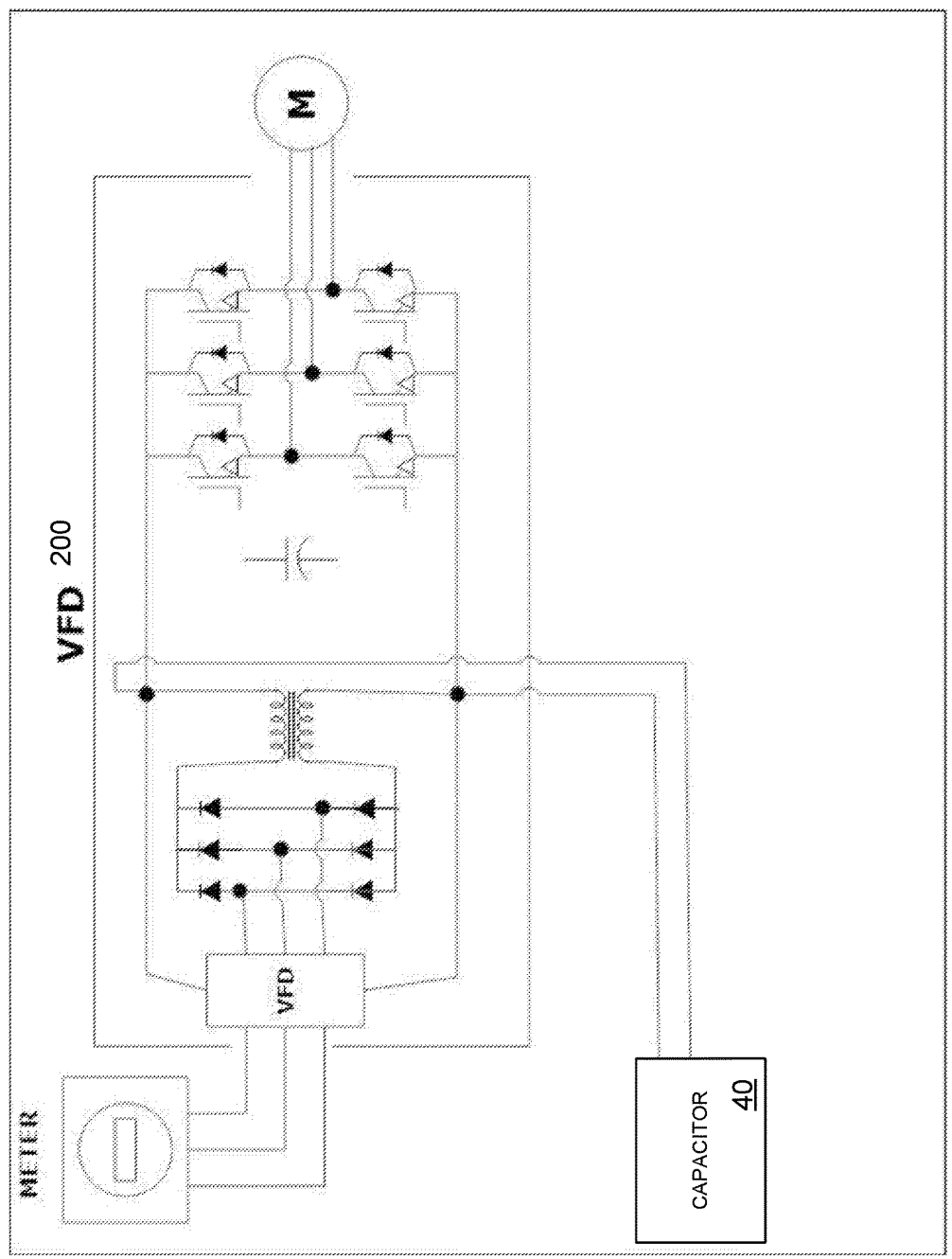
FIG. 4 shows a view of a system with a variable frequency/speed drive connected to a capacitor.
Figure 5:
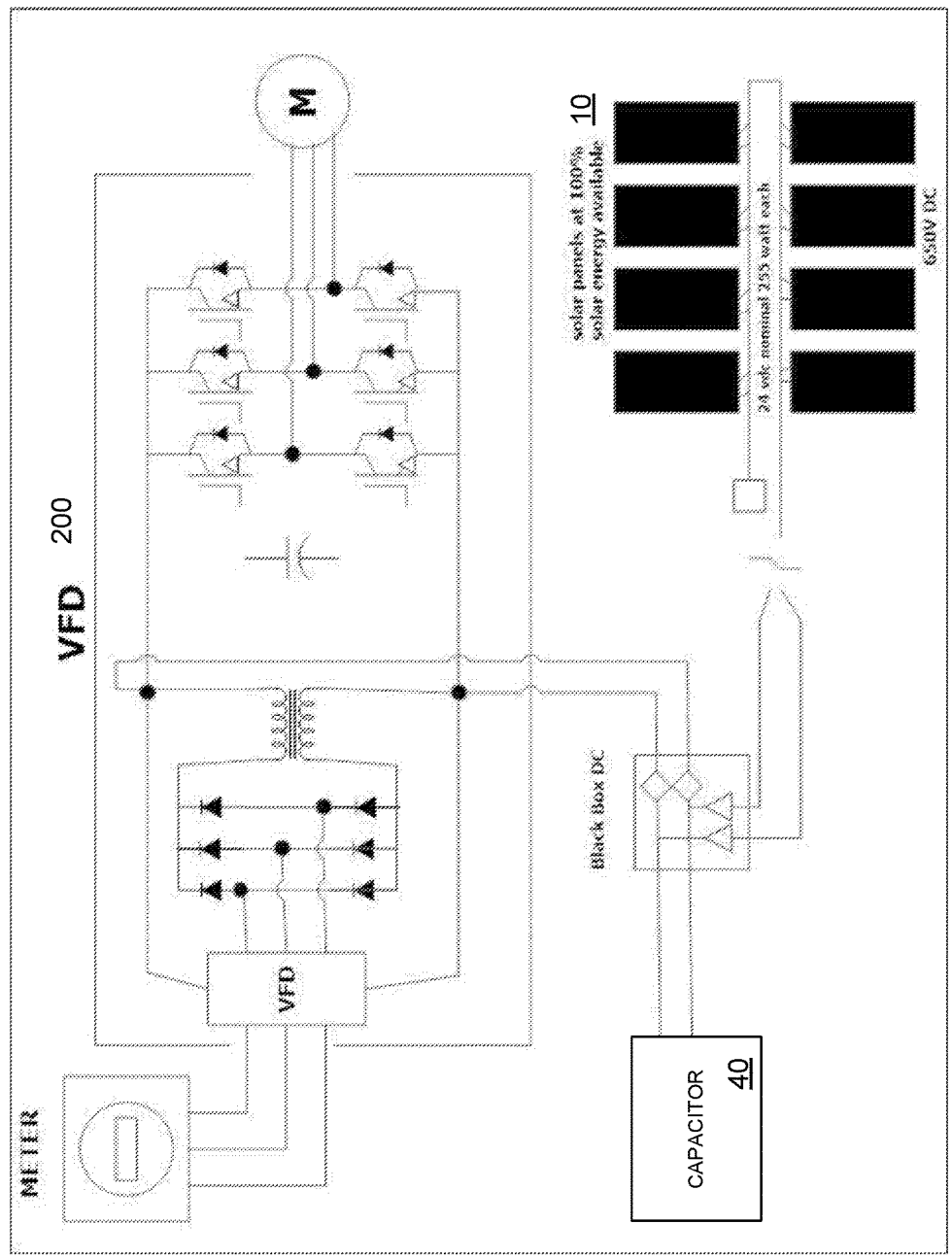
FIG. 5 shows a view of a system with a variable frequency/speed drive connected to a solar array and capacitor.
Figure 6:
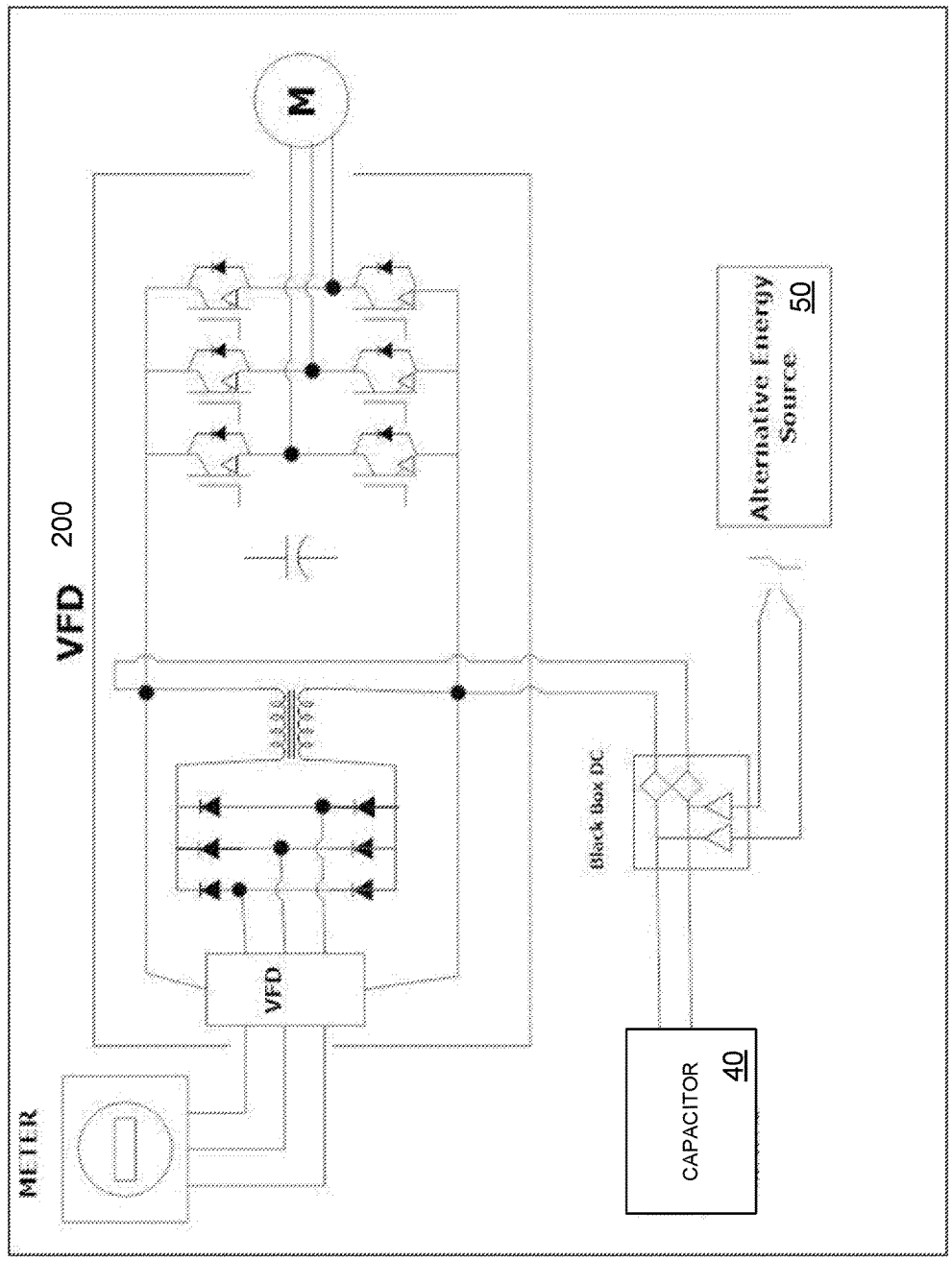
FIG. 6 shows a view of a system with a variable frequency/speed drive connected to an alternative energy source and capacitor.
Figure 7:
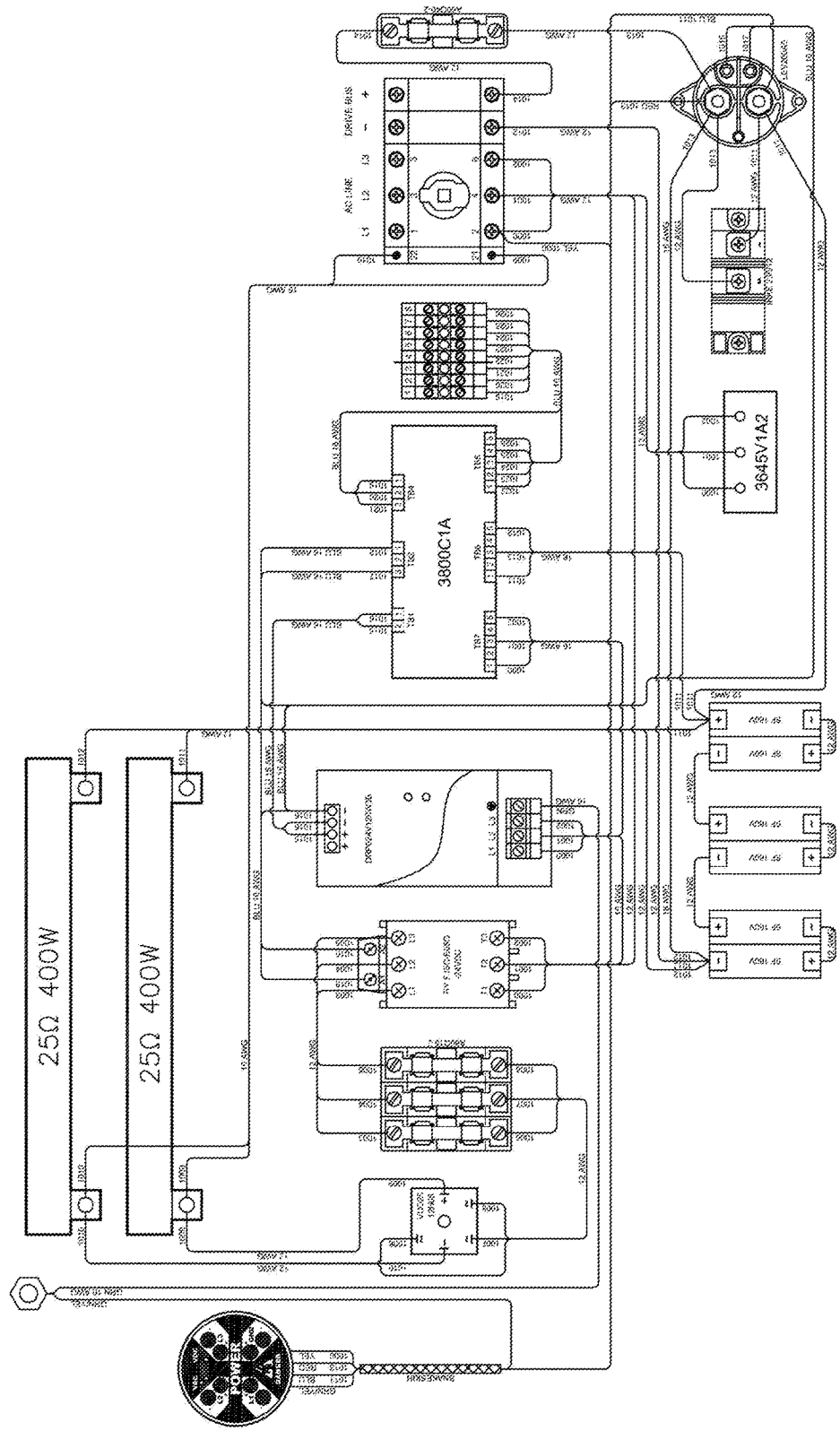
FIG. 7 shows a detailed view of a capacitor and wiring board.

In several embodiments, a capacitor or capacitor bank 40 (as seen in FIG. 7), may be used in direct connection with a VFD 200 (see FIG. 4), in connection with a solar array 10 and a VFD 200 (see FIG. 5), or in connection with one or more alternative energy sources 50 (including, but not limited to, wind, hydro, solar, geothermal, or the like) and a VFD 200 (see FIG. 6).

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An apparatus, comprising:
    a pump jack;
    a variable frequency drive for regenerating energy from a pump jack;
    a capacitor bank for storing regenerated energy from and supplying energy to said pump jack; and
    at least one solar panel, at least one wind turbine or at least one hydro-electric generator in electric communication with the variable frequency drive, wherein some or all of the energy required to operate the pump jack is obtained from the at least one solar panel, the at least wind turbine or the at least one hydro-electric generator.

2. The apparatus of claim 1, wherein at least one solar panel, at least one wind turbine or at least one hydro-electric generator is connected directly to a common DC buss.

3. The apparatus of claim 1, wherein the apparatus is connected to a utility power grid.

4. The apparatus of claim 1, wherein further comprising a battery bank.

5. The apparatus of claim 1, wherein the at least one solar panel, the at least one wind turbine or the at least one hydro-electric generator comprises a combination of one or more solar panels, wind turbines, or hydro-electric generators.

* * * * *